United States Patent [19]

Gindy et al.

[11] Patent Number: 4,635,025
[45] Date of Patent: Jan. 6, 1987

[54] CONSTANT BENDING MOMENT DEVICE FOR STRAIN GAUGE TRANSDUCERS

[75] Inventors: Sherif S. Gindy, Troy; Ronald R. Tremonti, Utica, both of Mich.

[73] Assignee: Eaton Corporation, Cleveland, Ohio

[21] Appl. No.: 736,919

[22] Filed: May 22, 1985

[51] Int. Cl.[4] ............................................. G01L 1/22
[52] U.S. Cl. ........................................ 338/5; 338/2; 73/862.65
[58] Field of Search ............... 338/2, 3, 4, 5; 73/726, 73/727, 862.65

[56] References Cited

U.S. PATENT DOCUMENTS 4,107,985 8/1978 Sommer ............................ 73/862.65

Primary Examiner—E. A. Goldberg
Assistant Examiner—M. M. Lateef
Attorney, Agent, or Firm—C. H. Grace; A. E. Chrow

[57] ABSTRACT

A constant bending moment device (70) for strain gauge measurement of a force (F) upon an object (32) by means of bending moment. Device (70) is provided with a base member (30) that is adapted to engage object (32) and has a pair of spaced-apart column members (34, 36) extending away from the side of base member (30) facing away from object (32). Column members (34, 36) have respective substantially parallel neutral axis (38, 40) and respective moment arms (37, 39) that extend generally orthogonally towards each other in overhanging relationship to base member (30) and merge at a common portion (24) therebetween having a loading axis (46) that is substantially parallel to neutral axis (38, 40) and equidistant therebetween. Portion (24) is adapted to receive and direct force (F) along loading axis (46) preferably by including an undercut (45) therein and columns (37, 39) have respective substantially equivalent constant cross-sectional configurations along the respective lengths thereof between base member (30) and moment arms (37, 39) such that force (F) imposes a substantially constant bending moment along said lengths enabling greater freedom in the location of one or more strain gauges therealong as well as eliminating moment gradients across the strain gauges.

7 Claims, 6 Drawing Figures

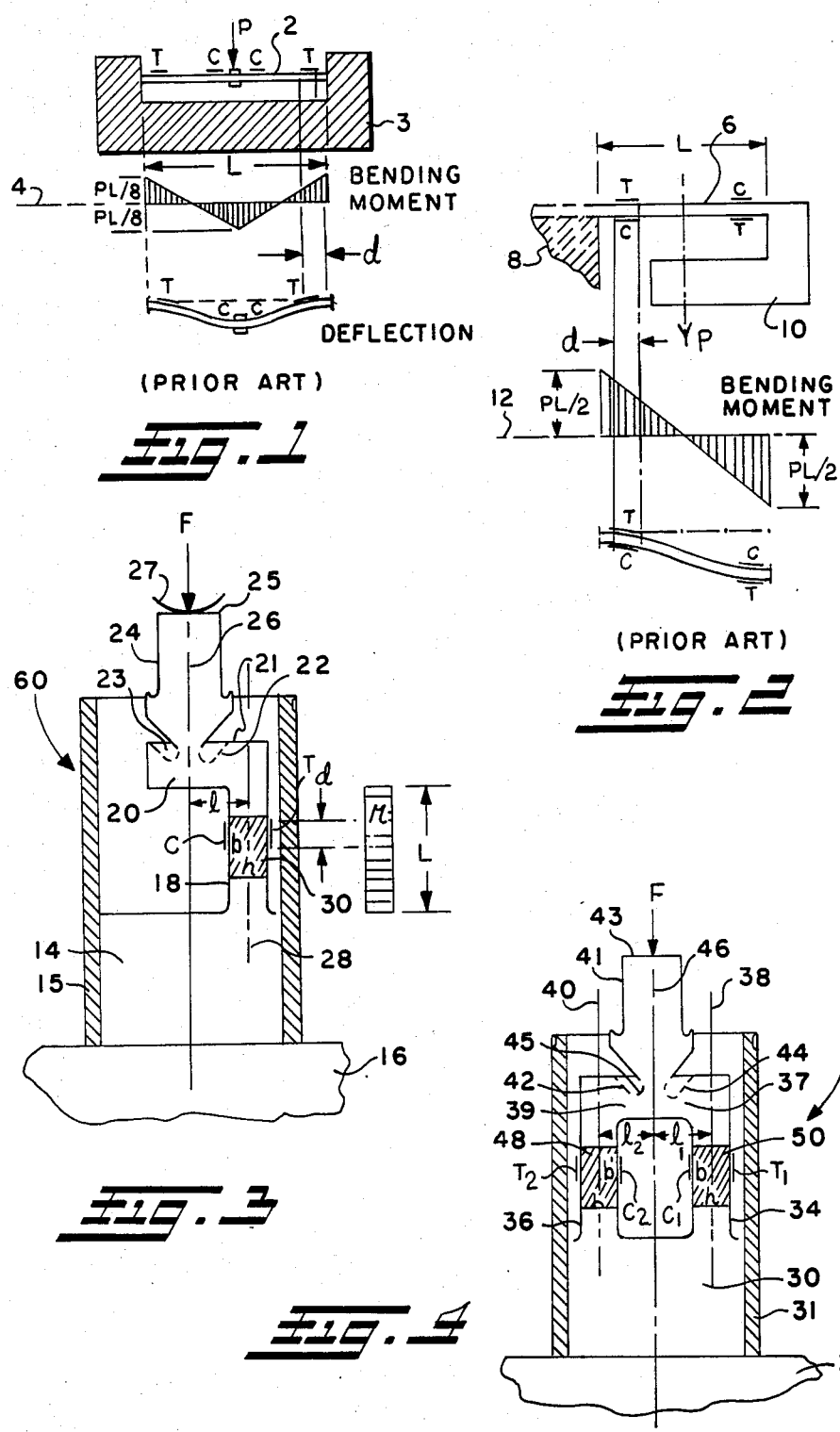

CONSTANT BENDING MOMENT DEVICE FOR STRAIN GAUGE TRANSDUCERS

INTRODUCTION

This invention relates generally to a bending moment device for enabling strain gauge transducers to monitor, for example, a force being applied to an object and more particularly to a constant bending moment device for enabling strain gauge transducers to monitor a force being applied to an object and other derivable parameters that allows greater freedom in the location of the strain gauge transducers and provides more consistent and meaningful information as well as eliminating bending moment gradients heretofore existing across the strain gauge transducers.

BACKGROUND OF THE INVENTION

Strain gauge transducers have been used for many years to measure bending moment applied to a beam secured at one or both of its ends to an object to which a force is being applied as a means of monitoring the force and other derivable parameters of interest. It has heretofore been common practice to mount strain gauges on one and more preferably on opposite sides of the beam in the same location adjacent the point at which the beam is secured to the object and then electrically connect the gauges in the same or on opposite legs of a wheatstone bridge suitably adapted to provide an output signal indicative of the effect of tension or compression upon the gauges caused by bending the beam which in turn can be used to determine bending moment due as a function of their respective locations which in turn can be used to determine the force being applied to the object and other parameters derivable therefrom by methods well known to those skilled in the art of beam bending moment analysis.

One of the problems up to the time of present invention associated with such prior-art transducer type measuring devices has been that heretofore the force has been applied generally in a direction transverse to the neutral axis of the bending member which results in a different bending moment at any given location along the beams for beams having one end secured to the object and which also may be different for identical symmetrical locations from the point of securement from beams that are secured at both ends when the force is not applied transversely at the midpoint location between oppositely secured ends.

In addition to the change in bending moment along the length of beams heretofor utilizing strain gauge transducers for providing desired information, the bending moment generally varies over infinitesimal distances along the length of the beam resulting in a gradient of bending moment even over the breadth of the strain gauge transducer resulting in uneven tension or compression imposed thereupon by the bending beams.

The varying bending moment phenomenon hereinbefore described results in great criticality in locating the strain gauge transducers along the beam for it is desirable to locate them at a point where the bending tension and compression is a maximum so as to provide the highest output signal possible. Consequently, singly or doubly supported beams which bend upon application of an applied load transverse to their longitudinal axis result in an almost infinite number of differing bending moments along their length which reduces effectiveness, accuracy, and consistency of strain gauge transducer measurements as well as imparting a bending moment gradient across the strain gauge transducer that even further accentuates the complexity and inaccuracies involved.

SUMMARY OF THE INVENTION

Accordingly, it is an object of this invention to provide a bending moment device for monitoring forces and other derivable parameters being imposed upon an object by means of strain gauge transducers.

It is another object of this invention to provide a bending moment device for monitoring forces and other derivable parameters being imposed upon an object by means of strain gauge transducers wherein the device is adapted to provide a bending moment that is substantially constant over the length of the beam resulting in greater freedom in location of the strain gauges and greater accuracy and consistency in desired information derived therefrom.

It is yet another object of this invention to provide a bending beam device utilizing strain gauge transducers that is provided with a substantially constant bending moment over a finite distance resulting in greater freedom with respect to the location of the strain gauge transducers as well as eliminating bending moment gradients heretofore extending across the strain gauge transducers resulting in greater accuracy, consistency and the provision of more meaningful information.

BRIEF DESCRIPTION OF THE DRAWINGS

FIG. 1 shows a partial cross-sectional view of a prior art device using strain gauge transducers for monitoring bending moment in a beam having both ends supported;

FIG. 2 shows a partial cross-sectional view of a prior art device using strain gauge transducers for monitoring bending moment in a beam having only one of its ends supported;

FIG. 3 shows a partial cross-sectional view of an embodiment of a constant bending moment beam device of the invention;

FIG. 4 shows a partial cross-sectional view of another constant bending moment device made in accordance with the invention.

BRIEF DESCRIPTION OF SOME PREFERRED EMBODIMENTS

Figure 5A:
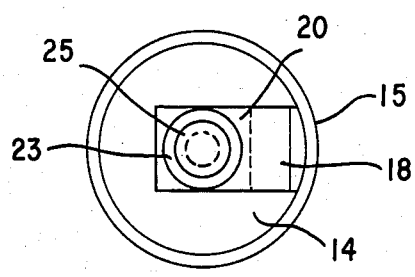
FIGS. 5A and 5B show a top elevation view of the strain gauge transducer of FIGS. 3 and 4 respectively.

FIG. 1 shows a prior art bending moment device featuring a beam 2 having a length "L" between opposite ends respectively secured to member 3. A load "P" is applied transverse to neutral axis 4 of beam 2 generally at its midpoint as shown in FIG. 1.

Support member 3 may itself be the object under study by means of strain gauges denoted as "T" (sensing tension) and "C" (sensing compression) or it may provide a base that is secured by suitable means to another object to which load "P" is being applied.

Although either or both tension sensing strain gauges and compression sensing strain gauges may be suitably mounted at numerous locations along length "L" of beam 3, the bending moment profile associated therewith and well known to those skilled in the art immediately shows that not only does the bending moment vary considerably along length "L" of beam 3 but also with distance "d" denoting the breadth of, for example, the strain gauge sensing tension at the right side of beam 3 as viewed in FIG. 1.

Generally, the bending moment is the product of load "P" times the distance between the location being examined along length "L" to the point of securement with counter-clockwise bending moment denoted beneath the neutral axis of the beam and clockwise bending moment denoted above the neutral axis of the beam.

Also shown in FIG. 1 is the deflection profile of beam 3 arising from the effect of load "P". It should be immediately apparent from FIG. 1 that the location of either or both tension and compression strain gauges is highly critical in order to provide the highest output signal from the strain gauge transducers and even then a bending moment gradient may exist across the strain gauges that even further affects their ability to accurately depict bending moment at their point of location along beam 3.

FIG. 2 shows another prior-art bending moment device featuring a beam 6 of length "L" secured at one of its ends to an object 8. A load "P" is applied to beam 6 at the location shown and the free-end of beam 6 has a weight 10 shaped to impart a counter-clockwise bending moment to beam 6 between the location at which load "P" is applied and the free-end. Tension sensing strain gauges denoted as "T" and compression sensing strain gauges denoted as "C" are located as shown in FIG. 2 and the resulting bending moment profile about neutral axis 12 of beam 6 again is shown to have a complex character not only along length "L" of beam 6 but also substantial variance within distance "d" across, for example, strain gauges "T" and "C" on the left of beam 6 as viewed in FIG. 2. Again, the resulting deflection profile is shown and again the criticality of location of either or both tension and compression strain gauges is immediately apparent as well as the bending moment thereacross resulting in inaccuracies in measuring actual bending moment at any particular location along length "L" of beam 6.

FIG. 3 shows an embodiment of a constant bending moment device 60 made in accordance with the invention. Device 60 has a base member 14 preferably in which may have any shape suitable for a particular application. Device 60 is being used to measure and/or monitor force "F" being applied to object 16 which may of course be any object lending itself to such analysis.

Although not shown, any suitable means may be included to mount device 60 onto object 16 such as providing device 60 with a mounting flange provided with holes for bolting device 60 to object 16.

Device 60 may be made from any material having the properties, particularly the property of modulus of elasticity suitable for the particular application involved. Typically, device 60 is made from a suitable steel or aluminum.

Device 60 may include a surrounding protective wall 15 about member 14 that may or may not be integral with base member 14 and that protects column 18 and moment arm 20 hereinafter described where such is desired.

A first post or column member 18 extends preferably integrally from a side of base member 14 facing away from object 16 to a free-end. Column 18 has a longitudinal neutral axis 28 that is spaced-apart by a prescribed distance "l" from and is substantially parallel to a longitudinal loading axis 26 of portion 24 of moment arm 20 hereinafter described.

A first moment arm 20 extends preferably integrally in an orthoginal direction from column 18 toward and past loading axis 26 to a free-end thereof in overhanging relationship to base member 14. Arm 20 has a force receiving portion 24 at its free-end having a longitudinal loading axis 26 that is substantially parallel to neutral axis 28 and has a surface 25 facing away from object 16 adapted to receive force "F" along axis 26. Portion 24 and in particular surface 25 may be provided with means such as a swiveling force receiving device 27 mounted thereupon to maintain the parallel relationshp between axis 26 and 28 to account for any deflection of arm 20 under the load of force "F". Arm 20 has a cross-sectional configuration parallel to neutral axis 28 adapted to enable arm 20 to resist bending under the effect of the load of force "F" and to constrain force "F" in a direction along loading axis 26. Arm 20 preferably has a surface 21 facing away from object 16 and base member 14 that has a taper 22 tapering away from column 18 towards object 16 between column 18 and portion 24 ending in an undercut 23 at portion 24 such that the area of cross-sectional configuration of arm 20 adjacent column 18 is greater than the area of the cross-sectional configuration of arm 20 adjacent portion undercut 23 of portion 24. Undercut 23 of portion 24 portion 24 limits the force received by portion 24 to a small localized area and therefor enables portion 24 to both receive and direct the force along loading axis 26. As shown in FIG. 5A, base member 14, protective wall 15, and portion 24 having surface 25 have a generally cylindrical configuration, with undercut 23 having a generally circular configuration and moment arm 20 and column 18 respectively having generally rectangular configurations.

Column 18 has a cross-sectional configuration 30 in a direction transverse to neutral axis 28 that is substantially constant along the length "L" of column 18 between base member 14 and arm 20. The cross-sectional configuration of column 18 is adapted to enable column 18 to bend a measurable amount under the bending moment thereupon created by the product of force "F" and distance "l".

Preferably, column 18 has a substantially constant rectangular cross-sectional configuration along its length with dimensions denoted as "b" and "h" with "h" being smaller by "b" by an amount enabling column 18 to bend outwardly away from loading axis 26 a measurable amount in response to the bending movement imparted thereto by force "F".

Column 18 has a compression sensing strain gauge denoted as "C" in the side thereof facing towards loading axis 26 and a tension sensing strain gauge denoted "T" as the side thereof facing way from loading axis 26 which are both electrically connected to a wheatstone bridge for providing a signal output therefrom that can be used to determine the bending moment on column 18, force "F" and other parameters derivable therefrom such as strain by equations well known to those skilled in the art.

Since force "F" is substantially constrained along loading axis 26, the bending moment "M" shown in FIG. 3 is substantially constant along column 18 within length "L" as well as within distance "d" across strain gauges "C" and "T". It then becomes immediately apparent that greater freedom is available for locating gauges "C" and/or "T" along column 18 as well as eliminating moment gradients thereacross.

FIG. 4 shows a preferred embodiment of the invention in the form of device 70 that is adapted to overcome any deflection under force "F" suffered by arm 20 of device 60. Device 70 has a base member 30 adapted to engage object 32 by suitable means (not shown) and provide information with respect to force "F" being applied to object 32 by means of bending moment analysis as well as other parameters of interest derivable therefrom. Device 70 may include a protective wall 31 for protecting hereinafter described base member 30, columns 34 and 36 and moment arm 37 and 39 where such is desired.

Device 70 has a pair of spaced-apart post or column members 34 and 36 extending preferably integrally away from a side of base member 30 facing away from object 32. Columns 34 and 36 have respective longitudinally extending neutral axis 38 and 40 that are substantially parallel with each other.

Moment arms 37 and 39 extend respectively preferably orthoginally from columns 34 and 36 towards each other in overhanging relationship to base member 30 and join each other to provide a unitary structure overhanging base member 30 having a common force receiving portion 41 having a longitudinally extending loading axis 46 that is substantially parallel to axis 38 and 40 and a surface 43 facing away from base member 30 that is adapted to receive force "F". Portion 41 and preferably surface 43 may further include means such as a swiveling device mounted thereupon previously described with respect to device 60 to maintain the substantial parallel relationship between axis 38 and 40 and 46 to account for any deflection in arms 37 and 39 under the load of force "F" where such is desired. It can readily be seen that the combination of arms 37 and 39 of device 70 doubly supported by columns 34 and 36 is less apt to deflect under the load of force "F" than the single supported moment arm 20 of device 60 thereby in the most part eliminating any need for a swiveling device to maintain parallelism between axis 38, 40 and 46.

Figure 5B:
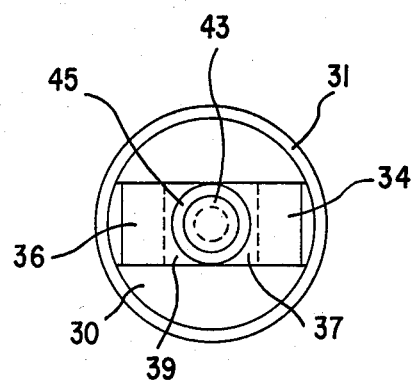

Arms 37 and 39 have substantially equivalent cross-sectional configurations in a direction generally parallel to axis 38 and 40 that are respectively adapted to resist bending of arms 37 and 39 under the load of force "F" and maintain their substantially orthogonal relationship with respective axis 38 and 40. Preferably arms 37 and 39 have respective tapers 42 and 44 on respective sides of arms 37, 39 that respectively taper from columns 34 and 36 towards base member 30 to portion 41 which, like device 60, may be provided with an undercut 45 adapted to concentrate and direct force "F" along loading axis 46. The result being that the transverse areas of arms 37 and 39 respectively adjacent columns 34 and 36 is greater than their respective transverse areas adjacent portion 41 by an amount sufficient to prevent moment arms 37 and 39 from bending significantly under the load thereupon provided by force "F". As shown in FIG. 5B, base member 30, protective wall 31, and portion 21 having surface 43 have generally cylindrical configurations with undercut 45 having a generally circular configuration and moment arms 37 and 39 and columns 34 and 36 respectively having generally rectangular configurations.

It will be noted that loading axis 46 is located preferably substantially equidistant between neutral axis 38 and 40 by respective distances denoted "$l_1$", and "$l_2$" which are preferably substantially the same so as to result in substantially equivalent bending moments being imparted to columns 34 and 36 by force "F" which is the product of the force "F" times "$l_1$" for column 34 and force "F" times "$l_2$" for column 36.

Columns 34 and 36 are respectively provided with substantially constant cross-sectional configurations transverse to their respective neutral axis 38 and 40 along the respective lengths thereof between base member 30 and respective arms 37 and 39. Preferably, columns 34 and 36 have respective rectangular transverse cross-sectional configurations having dimensions b and h and $b_1$ and $h_1$ respectively of which the h and $h_1$ dimensions are respectively sufficiently smaller than the b and $b_1$ dimensions to enable columns 34 and 36 to respectively bend outwardly away from loading axis 46 a measurable amount under the load of force "F".

Compression sensing strain gauges $C_1$ and $C_2$ are mounted respectively on the side of columns 34 and 36 facing towards axis 46 and tension sensing strain gauges $T_1$ and $T_2$ are mounted respectively on the side of columns 34 and 36 facing away from axis 46.

The parallelism of loading axis 46 and respective neutral axis 38 and 40 of column 34 and 36 as well as the resistance to substantial bending of arms 37 and 39 and the substantially constant transverse cross-section configuration of columns 34 and 36 along their respective lengths provides a substantially constant bending moment profile along the length of columns 34 and 36 which in turn results in greater freedom in locating tension and/or compression sensing strain gauges along the length of one or both of columns 34 and 36 in addition to eliminating bending moment gradients across the strain gauges.

Generally, the cross-sectional configurations of the moment arms of the device of the invention, whether single as in device 60, or double and merged into a unitary structure as in device 70, are adapted to provide negligible deflection under the load of the force so as to maintain their substantial orthogonal relationship with the neutral axis the column members of the device yet enables the column members to bend a measurable amount under the load of force (F).

What is claimed is:

1. A constant bending moment beam device for strain gauge transducer measurement and/or monitoring of force applied to an object by means of bending moment and other parameters derivable therefrom, said device comprising:

a base member adapted to engage an object, a first column member extending away from a side of the base member facing away from the object and having a longitudinal extending neutral bending axis, a first moment arm extending generally orthogonally from the first column member in overhanging relationship to the base member, said first moment arm having a portion thereof adapted to receive and direct a force along a longitudinally extending loading axis that is substantially parallel to the first column member neutral axis and displaced therefrom by a prescribed distance, said first column member having a substantially constant cross-sectional configuration substantially along the length thereof between the base member and the moment arm transverse to the neutral axis thereof adapted to enable the first column member to bend a measurable amount in response to the force being applied to the object, at least one strain gauge secured to the first column member along the length thereof having said substantially constant cross-sectional configuration, and said first moment arm having a cross-sectional configuration in a direction substantially parallel to the column member neutral axis adapted to maintain the orthoginal relationship between the moment arm and the first column member neutral axis while constraining the force along the loading axis while applying a bending moment to the column member measurable by the strain gauge that is the product of the force times the prescribed distance between the loading axis and the first column member neutral axis and which is substantially constant along the length of the column member between the moment arm and the base member enabling a greater degree of freedom in the location of said strain gauge along the length of the first column member having said substantial constant cross-sectional configuration for measuring the bending moment imparted to the first column member by the force as well as eliminating any bending moment gradient across the strain gauge.

2. The device of claim 1 including a second column member extending from the side of the base member facing away from the object in spaced-apart relationship to the first column member, said column member having a longitudinal neutral axis thereof that is substantially parallel to the first column member neutral axis, a second moment arm extending generally orthogonally from the second column member towards the first moment arm in overhanging relationship to the base member, said second moment arm joining the first moment arm at the loading axis to provide a unitary structure having a portion therebetween adapted to receive and direct the force along a common longitudinally extending loading axis that is substantially parallel to the first and second column members neutral axis, said second column member having a substantially constant cross-sectional configuration along the length thereof between the base member and the second moment arm in a direction transverse to the neutral axis thereof that is substantially the same as the first column member cross-sectional configuration and adapted to enable the second column member to bend a measurable amount in response to the force being applied to the object, said second moment arm having a cross-sectional configuration in a direction substantially parallel to the second column member neutral axis that is adapted to maintain the orthogonal relationship between the second moment arm and the second column member while constraining the force being applied to the object along the loading axis, and said second column member spaced-apart from the first column member such that the loading axis lies substantially equidistant between the respective neutral axis of the first and second column members so that the force imparts a bending moment to the second column member that is both substantially constant along the length thereof between the base member and the second moment arm as well as substantially the same as the bending moment imparted by the force to the first column member enabling a greater degree of freedom in the location of at least one strain gauge along the length of at least one of said first and second column members having said substantially constant cross-sectional configuration for measuring the bending moment imparted thereto by the force as well as eliminating any bending moment gradient across the strain gauge.

3. The device of claim 1 wherein the substantially rectangular cross-sectional configuration of the first column member is adapted to enable the first column member to bend outwardly away from the loading axis a measurable amount by the bending moment imparted thereto.

4. The device of claim 2 wherein the substantially rectangular cross-sectional configuration of both the first and second column members is adapted to enable both the first and second column members to respectively bend outwardly away from the loading axis a measurable amount by the bending moment imparted thereto.

5. The device of claim 1 wherein the first moment arm has a surface facing away from the object between the force receiving portion thereof and the first column member that tapers generally away from the first column member towards the base member to provide a cross-sectional configuration adjacent the first column member that is greater in area than the area of the cross-sectional configuration of the first moment arm adjacent the force receiving portion thereof.

6. The device of claim 2 wherein both the first and second moment arms have a surface facing away from the object between the force receiving portion common to both and the respective first and second column members that tapers generally respectively from the first and second column members towards the base member to provide respective cross-sectional configurations thereof adjacent respective first and second column members that is greater in area than the respective cross-sectional configuration areas thereof adjacent the force receiving portion common therebetween.

7. The device of claim 1 or 2 including swiveling means mounted on the a surface of force receiving portion facing away from the base member adapted to receive the force and operative to maintain parallelism between the loading axis and the column member neutral axis.

* * * * *